(12) United States Patent
Tanabe et al.

(10) Patent No.: US 8,413,123 B2
(45) Date of Patent: Apr. 2, 2013

(54) COMPILING DEVICE AND COMPILING METHOD

(75) Inventors: Yasuki Tanabe, Chiba (JP); Takashi Miyamori, Kanagawa (JP); Shunichi Ishiwata, Chiba (JP); Katsuyuki Kimura, Kanagawa (JP); Keiri Nakanishi, Kanagawa (JP); Masato Sumiyoshi, Tokyo (JP); Ryuji Hada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 12/876,599

(22) Filed: Sep. 7, 2010

(65) Prior Publication Data

US 2011/0138371 A1 Jun. 9, 2011

(30) Foreign Application Priority Data

Dec. 4, 2009 (JP) ................................ 2009-276672

(51) Int. Cl.
*G06F 9/45* (2006.01)
(52) U.S. Cl. ................... 717/140; 717/136; 382/303
(58) Field of Classification Search .................. 717/140; 382/303
See application file for complete search history.

(56) References Cited

U.S. PATENT DOCUMENTS

| | | | |
|---|---|---|---|
| RE38,911 E * | 12/2005 | Anderson et al. ............. | 382/302 |
| 7,694,288 B2 * | 4/2010 | Higham ......................... | 717/144 |
| 2004/0154006 A1 * | 8/2004 | Heishi et al. .................. | 717/140 |
| 2005/0030585 A1 * | 2/2005 | Suwa et al. ................... | 358/1.16 |
| 2005/0065973 A1 * | 3/2005 | Steensgaard et al. ..... | 707/103 Y |
| 2005/0288928 A1 * | 12/2005 | Bergl et al. ................... | 704/242 |
| 2006/0159349 A1 * | 7/2006 | Chiang et al. ................ | 382/232 |
| 2007/0150875 A1 * | 6/2007 | Nakamura et al. ............ | 717/136 |
| 2008/0101727 A1 * | 5/2008 | Talla ............................. | 382/303 |
| 2010/0103282 A1 | 4/2010 | Nakanishi et al. | |
| 2010/0110289 A1 | 5/2010 | Tanabe et al. | |
| 2010/0262839 A1 * | 10/2010 | Eker et al. .................... | 713/190 |

FOREIGN PATENT DOCUMENTS

JP  2005-11380  1/2005

OTHER PUBLICATIONS

J. Hammes, B. Draper and W. Böhm; "Sassy: A Language and Optimizing Compiler for Image Processing on Reconfigurable Computing Systems", International Conference on Vision Systems, Las Palmas de Gran Canaria, Spain; Jan. 13-15, 1999, pp. 83-97.*
T. L. B. Yng et al.; "A Low Complexity and Lossless Frame Memory Compression for Display Devices"; IEEE Transactions on Consumer Electronics, vol. 54, No. 3, Aug. 2008; pp. 1453-1458.*
Carl D. Offner; "Notes on Graph Algorithms Used in Optimizing Compilers"; University of Massachusetts Boston, Computer Science webpage; Apr. 26, 2011; pp. 1, 19-44, 93-94.*

* cited by examiner

*Primary Examiner* — Wei Zhen
*Assistant Examiner* — Clint Thatcher
(74) *Attorney, Agent, or Firm* — Oblon, Spivak, McClelland, Maier & Neustadt, L.L.P.

(57) ABSTRACT

According to an embodiment, a compiling device compiling a source program written so as to use a frame memory includes a processing delay amount calculator configured to calculate respective processing delay amounts between a plurality of process tasks in the source program on the basis of processing states of pieces of data processed by the process tasks. The compiling device also includes a line memory amount calculator configured to calculate respective line memory sizes required for each of the process tasks on the basis of an access range of a frame memory from which the process task reads data and an instruction code converter configured to convert the plurality of process tasks to instruction codes executable in a pipeline on the basis of the processing delay amounts and the line memory sizes.

11 Claims, 11 Drawing Sheets

FIG.3A

```
00: for(int v = 0;v<VERTICAL WIDTH OF FRAME MEMORY; v++){
01:   for(int h = 0;h< HORIZONTAL WIDTH OF FRAME MEMORY; h++){
02:     int acc = 0;
03:     acc += (inFrame[v-1][h-1] + inFrame[v+1][h+1]>>1;
04:     acc += (inFrame[v-1][h+1] + inFrame[v+1][h-1]>>1;
05:     outFrame [v] [h] acc >>1;
06:   }
07: }
```

FIG.3B

```
00: for(int v = 0;v<VERTICAL WIDTH OF FRAME MEMORY; v++){
01:   for(int h = 0;h< HORIZONTAL WIDTH OF FRAME MEMORY; h++){
02:     int acc = 0;
03:     acc += (inAFrame[v-1][h-1] + inAFrame[v+1][h+1] >>1;
04:     acc += (inBFrame[v-1][h+1] + inBFrame[v+1][h-1] >>1;
05:     outFrame [v] [h] acc >>1;
06:   }
07: }
```

COMPILING DEVICE AND COMPILING METHOD

CROSS-REFERENCE TO RELATED APPLICATION(S)

This application is based upon and claims the benefit of priority from Japanese Patent Application No. 2009-276672 filed on Dec. 4, 2009; the entire contents of which are incorporated herein by reference.

FIELD

Embodiments described herein relate generally to a compiling device and a compiling method.

BACKGROUND

In conventional image processing in which digital signal processing is applied to input image data, the input image data is received from a sensor input such as a camera and a defective pixel correction process is performed on the entire input image data. In an image processor, intermediate image data obtained as output image data from the execution of the defective image correction process is input into a subsequent process, for example a shading correction process, and output image data from the execution of the shading correction process is further input into a subsequent process, and so on. In this way, various processes may be applied to image data, which is intermediate data between processes.

In the case where each process task such as defective pixel correction and shading correction process tasks receives input image data and outputs image data having the same data size as the input image data and a subsequent process receives the resulting output data and applies processing to the data as described above, the process tasks can be straightforwardly programmed, developed and modified by writing a program so as to use a memory area (frame memory) allocated for storing data of the size of input image data.

However, when data of the size of input image data is passed from one process task to another, a frame memory capable of holding data of the size of the input image data is required. Specifically, if the size of input image data is 20 Mbytes, 20 Mbytes of frame memory is required for holding the input image data and another 20 Mbytes of frame memory is required for holding intermediate image data. A total of 40 Mbytes of memory area is required for the entire process.

Therefore, when such processes are built into an embedded device or the like, typically the fact that each process task refers to a limited range of input data to calculate data of a certain pixel location is used to modify the process tasks so that the process tasks are executed in a pipeline, thereby minimizing the amount of data retained between the processes.

For example, an image processing apparatus has been proposed that has multiple image processing means that performs line processing by pipeline control (for example see Japanese Patent Application Laid-Open Publication No. 2005-11380).

For example, suppose that process tasks are to be modified so that the tasks are executed in a pipeline and that a process task, for example a process task that performs defective pixel correction, reads data in a rectangular region with vertical coordinates of v−1 to v+1 and horizontal coordinates of h−1 to h+1 in input image data in order to calculate data to be written in locations with vertical coordinates v and horizontal coordinates h in intermediate image data, performs an operation on the read data, and then writes output data. Here, let Vin denote the vertical coordinate of input image data written at a particular timing, Hin denote the horizontal coordinate of the input image data written in that timing, Va denote the vertical coordinate position in an image of intermediate image data to be calculated by the defective pixel correction process task, and Ha denote the horizontal coordinate position in the image. When the process is modified so as to be executed in a pipeline, a difference of −1 in relative vertical coordinate and a difference of −1 relative horizontal coordinate need to be provided between a pair of Vin and Hin and a pair of Va and Ha according to a range of data to be read by the defective pixel correction process task. That is, a delay needs to be provided in the process. The difference between relative coordinate positions will be referred to as amount of processing delay. Each time input image data at the coordinates Vin and Hin is written, Vin and Hin are incremented in raster scan order, an operation of the defective pixel correction process task is performed on data in the position Va, Ha, and Va and Ha are also incremented in the raster scan order.

When the cycle of writing input image data and executing the process task is repeated on a pixel-by-pixel basis while each pixel location is incremented in the raster scan order, an appropriate amount of process delay need to be provided for each process task.

Here, the raster scan order process is a process in which the horizontal coordinate is incremented to advance the scanning motion with respect to the upper-left of input image data and, after the horizontal coordinate is incremented to the rightmost end of the input image data, the vertical coordinate is incremented by 1 and the horizontal coordinate is reset to 0, thereby increasing the vertical and horizontal coordinates.

In order for the defective pixel correction process task to perform processing on certain vertical and horizontal coordinates $Va_\alpha$, $Ha_\alpha$ in a certain execution cycle α in the pipeline execution as described above, rectangular region data ($Va_\alpha$−1, $Ha_\alpha$−1) ... ($Va_\alpha$+1, $Ha_\alpha$+1) of input image is required. The rectangular region data is equivalent to a rectangular region ($Vin_\alpha$−2, $Hin_\alpha$−2) ... ($Vin_\alpha$, $Hin_\alpha$).

In a next execution cycle α+1, the defective pixel correction process task requires rectangular region data ($Va_\alpha$−1, $Ha_\alpha$) ... ($Va_\alpha$+1, $Ha_\alpha$+2) of the input image. The rectangular region data to be accessed in the execution cycle α+1 is equivalent to a rectangular region ($Vin_\alpha$−2, $Hin_\alpha$−1) ... ($Vin_\alpha$, $Hin_\alpha$+1).

Therefore, data in the location ($Vin_\alpha$−2, $Hin_\alpha$−2) of the input image is accessed in the execution cycle α whereas the data in the location ($Vin_\alpha$−2, $Hin_\alpha$−2) is not required in the execution cycle α+1 and data in the location ($Vin_\alpha$, $Hin_\alpha$+1) is newly required instead.

Accordingly, in a certain execution cycle γ in the pipeline execution, an area to store data in a rectangular region from the starting point ($Va_\gamma$−1, $Ha_\gamma$−1) to the coordinates ($Va_\gamma$+1, $Ha_\gamma$+1) in raster scan order on the input image, that is, data in the region ($Vin_\gamma$−2, $Hin_\gamma$−2) ... ($Vin_\gamma$, $Hin_\gamma$) of input image, that is, 2 lines+3 pixels of data, needs to be allocated on memory so that the defective pixel correction task can be continuously executed. Pipeline execution as described above can significantly reduce the amount of memory required for executing processing, as compared with execution in which a memory area for one frame of input image data is allocated and date is passed from one process to another.

A memory area that holds only a number of lines+a number of pixels of data being passed from one process task to another executed in a pipeline in this way is hereinafter referred to as line memory.

However, in order to use pipeline execution to reduce the required amount of memory, a user needs to write process tasks so as to use line memories. The user need to consider data access relationship between the process tasks to add an appropriate processing delay amount to each process, and to write the process tasks in a source file by taking into consideration the required line memory size. Productivity had been reduced by this procedure.

Furthermore, when the user has made a modification to a process task, the amount of processing delay and the required line memory size need to be changed according to the modification. Recalculation of the amount of processing delay and the required line memory size for the modification further decreases the productivity. If the user miscalculates the amount of processing delay and the required line memory size, it is difficult to identify errors. These problems will be especially remarkable if processes to be implemented are complicated, that is, data is passed from one process to another in a complicated manner.

As has been described above, writing a process task so as to use line memory has a problem that it decreases productivity—compared with writing a process task so as to use frame memory.

BRIEF DESCRIPTION OF THE DRAWINGS

FIG. 3A is a diagram illustrating an exemplary process task written in a source file;

FIG. 3B is a diagram illustrating an exemplary process task written in a source file;

DETAILED DESCRIPTION

According to an embodiment, a compiling device compiling a source program written so as to use a frame memory includes a processing delay amount calculating section configured to calculate respective processing delay amounts between a plurality of process tasks in the source program on the basis of processing states of pieces of data to be processed by the process tasks. The compiling device also includes a line memory amount calculating section configured to calculate respective line memory sizes required for each of the process tasks on the basis of an access range of a frame memory from which the process task reads data and an instruction code converting section configured to convert the plurality of process tasks to instruction codes executable in a pipeline on the basis of the processing delay amounts and the line memory sizes.

Embodiments will be described in detail with reference to drawings.

(First Embodiment)

Figure 1:
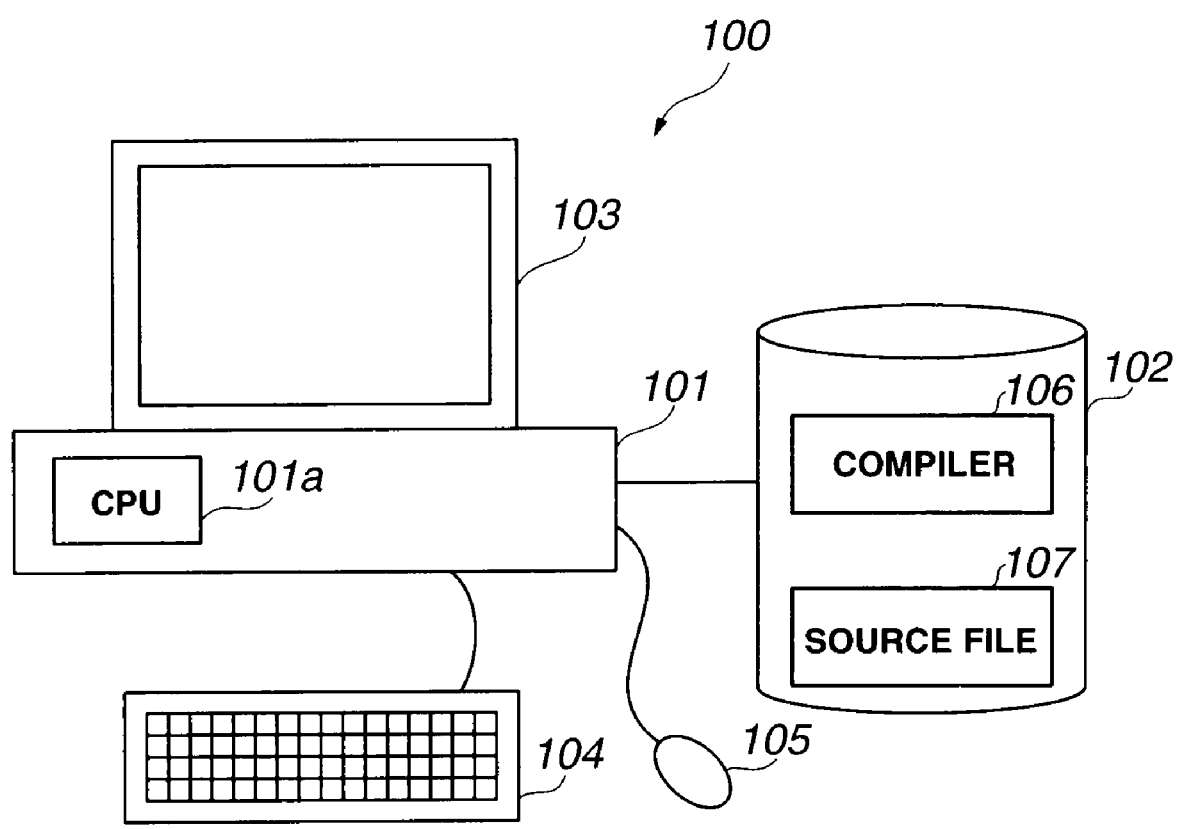
FIG. 1 is a block diagram illustrating a configuration of an information processing system relating to a first embodiment.

A configuration of an information processing system relating to a first embodiment will be described first with respect to FIG. 1. FIG. 1 is a block diagram illustrating a configuration of an information processing system relating to the first embodiment.

As illustrated in FIG. 1, an information processing system 100 includes a system unit 101, a storage device 102 configured to store various kinds of data, and a display device 103 configured to display various kinds of data. The system unit 101 is a computer system unit such as a personal computer and includes a CPU 101a, a main memory, not depicted, and other components. A keyboard 104 and a mouse 105 are connected to the system unit 101 as input devices. The system unit 101 executes various programs according to instructions input through the input devices.

A compiler 106 having a compiling function program and a source file 107 which is a source program written in a programming language such as C, for example, are stored in the storage device 102.

A user can use the source file 107 as an input and execute the compiler 106, which is a compiling program, on the system unit 101 to obtain an object file 108, which will be described later. The object file 108, not depicted, is stored in the storage device 102. The compiler 106 executed on the system unit 101 implements a compiling device according to the present embodiment. While the compiler 106, the source file 107, and the object file 108 are stored in the storage device 102, the compiler 106 and the source and object files 107 and 108 may be stored in other storage medium.

Figure 2:
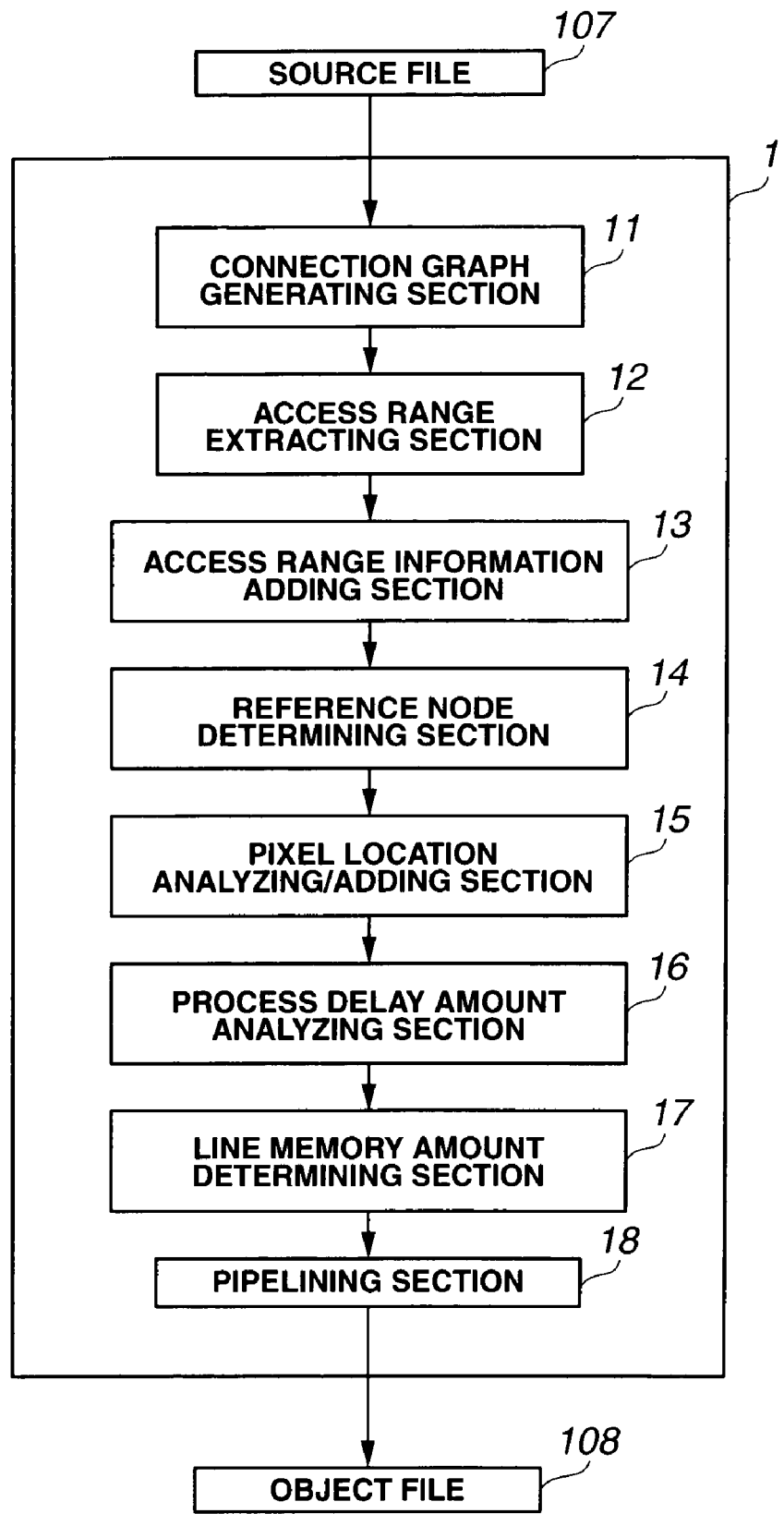
FIG. 2 is a block diagram illustrating a configuration of a compiling device.

A configuration of the compiling device configured as described above will be detailed below. FIG. 2 is a block diagram illustrating a configuration of the compiling device 1. As illustrated in FIG. 2, the compiling device 1 includes a connection graph generating section 11, an access range extracting section 12, an access range information adding section 13, a reference node determining section 14, a pixel location analyzing/adding section 15, a process delay amount analyzing section 16, a line memory amount determining section 17, and a pipelining section 18.

The compiling device 1 receives a source file 107, which was written so as to use frame memory and generates an object file 108 that can be executed in a pipeline.

Process tasks written in a source file 107 to be input in the compiling device 1 will be described below.

FIGS. 3A and 3B are diagrams illustrating exemplary process tasks written in a source file.

The process tasks in FIGS. 3A and 3B are written so as to use frame memory. The source file 107 includes multiple process tasks as those illustrated in FIGS. 3A and 3B. In lines 0 and 1 of each task, a double loop is written that increments vertical and horizontal coordinates so as to be in raster scan order. Processing in the double loop of each process task to be performed on the location with vertical coordinate v and horizontal coordinate h is written in lines 2 through 5.

In the processing in the double loop, one or more frame memories are received as an input and a region centered on (v, h) in the input frame(s) is accessed. The region to be access is statically determined during compiling.

For example, in line 3 in FIG. 3A, data in a region centered on the location (v, h) including the location −1 displaced from the center (v, h) in a vertical direction and −1 displaced in a horizontal direction and the location +1 displaced in a vertical direction and +1 displaced in a horizontal direction are accessed as an input frame "inFrame".

In the processing in the double loop, one or more frame memories are received as an input frame or frames and data is written in the location (v, h) in an output frame or frames only once. For example, one frame memory "inFrame" is received as an input frame in FIG. 3A; two frame memories "inAFrame" and "inBFrame" are received as input frames in FIG. 3B.

While the process tasks written in C language have been described, process tasks may be written in any other language as long as the process tasks are written so as to execute the processing as described above.

The source file 107 written as described above is input into the connection graph generating section 11 of the compiling device 1.

Figure 4:
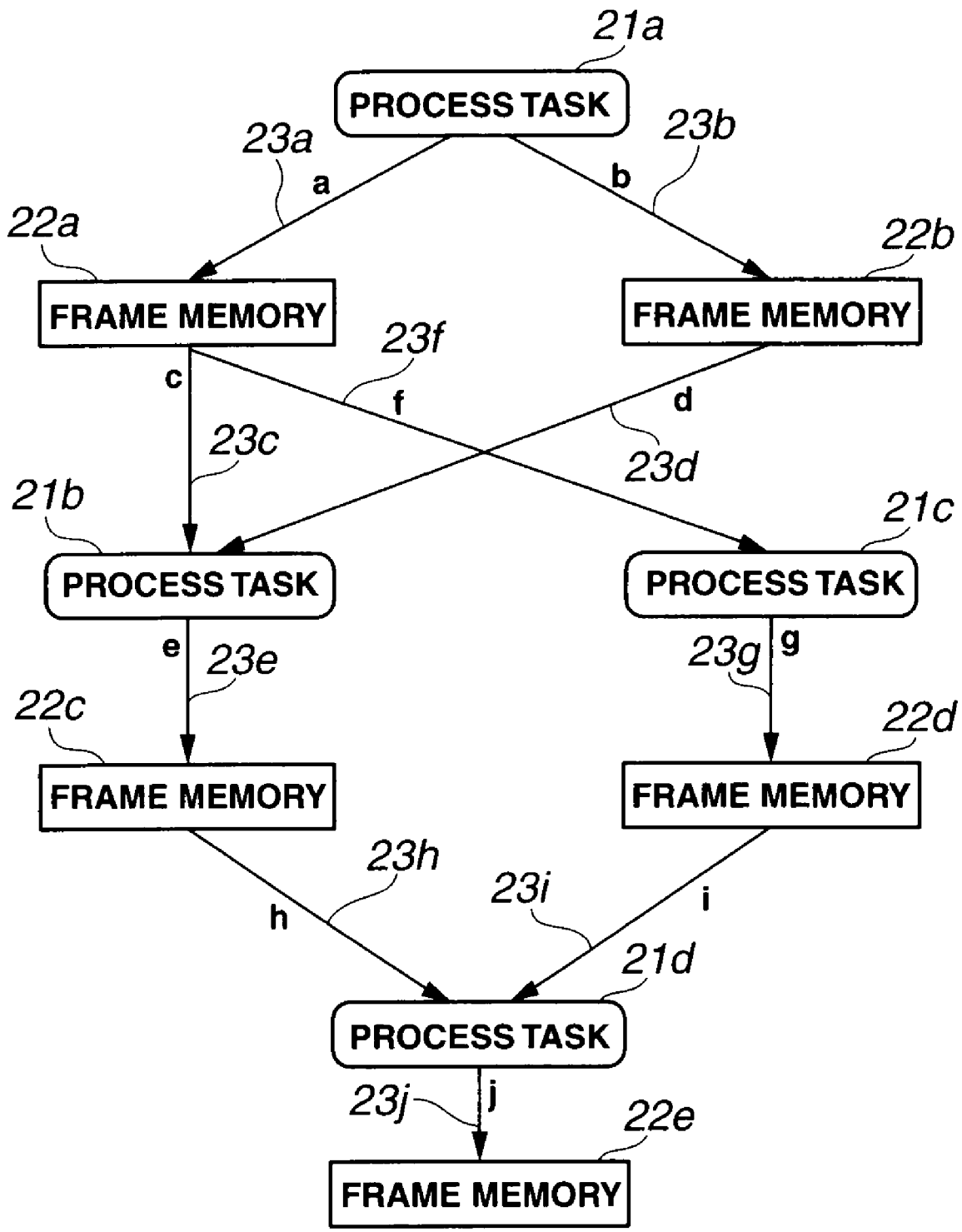
FIG. 4 is a diagram illustrating a directed graph generated by a connection graph generating section.

The connection graph generating section 11, which is a directed graph generator, receives the source file 107 including process task descriptions such as the examples illustrated in FIGS. 3A and 3B, for example, as an input and generates a directed graph illustrated in FIG. 4.

FIG. 4 is a diagram illustrating an example of a directed graph generated by the connection graph generating section 11.

The connection graph generating section 11 first extracts a unit of process tasks from the process task descriptions in the source file 107 and sets the extracted process tasks as nodes.

Then, the connection graph generating section 11 extracts frame memories to be accessed by the process tasks and sets the extracted frame memories as nodes. The connection graph generating section 11 then generates directed edges, each connecting the node of each process task with the node of the frame memory from which that process task reads data, and connects the nodes together. Similarly, the connection graph generating section 11 generates directed edges, each connecting the node of each process task with the node of the frame memory into which that process task writes data, and connects the nodes together. The connection graph generating section 11 then adds different labels to the generated edges.

For example, in FIG. 4, process tasks 21a to 21d have been extracted as process task nodes and frame memories 22a to 22e have been extracted as frame memory nodes. Edges 23a to 23j have been generated from the access relationship between the process tasks 21a to 21d and the frame memories 22a to 22e to connect the process tasks and the frame memories. Edges 23a to 23j are labeled a to j, respectively.

Then, for each process task, the access range extracting section 12, which is an access range extractor, analyzes in what range the process task is to access, centered at a pixel (Vx, Hx) to be accessed by the process task in a certain cycle in each frame memory to be read, and extracts largest and smallest values in the range to be accessed as largest and smallest access range values, respectively.

For example, in the process task description in FIG. 3A, data in a frame memory "inFrame" is accessed at +1 in a vertical direction and at +1 in a horizontal direction at maximum and at −1 in the vertical direction and −1 in a horizontal direction at minimum. Thus, the largest access range values in the frame memory "inFrame" accessed by the process task are (1, 1) and the smallest access range values are (−1, −1). Here, x and y in (x, y) represent the vertical and horizontal access range values.

In the process task description in FIG. 3B, data accessed in a frame memory "inAFrame" is accessed at +1 in a vertical direction and at +1 in a horizontal direction at maximum and at −1 in a vertical direction and at −1 in a horizontal direction at minimum. The process task also accesses data in a frame memory "inBFrame" at +1 in a vertical direction and −1 in a horizontal direction at maximum and at −1 in a vertical direction and at +1 in a horizontal direction at minimum. Thus, the largest access range values in the frame memory "inAFrame" accessed by the process task are (1, 1) and the smallest access range values are (−1, −1). The largest access range values in the frame memory "inBFrame" are (1, −1) and the smallest access range values are (−1, 1).

Then the access range information adding section 13 adds information indicating the largest and smallest access range information extracted by the access range extracting section 12 to the labels of the corresponding edges in the directed graph generated by the connection graph generating section 11.

Figure 5:
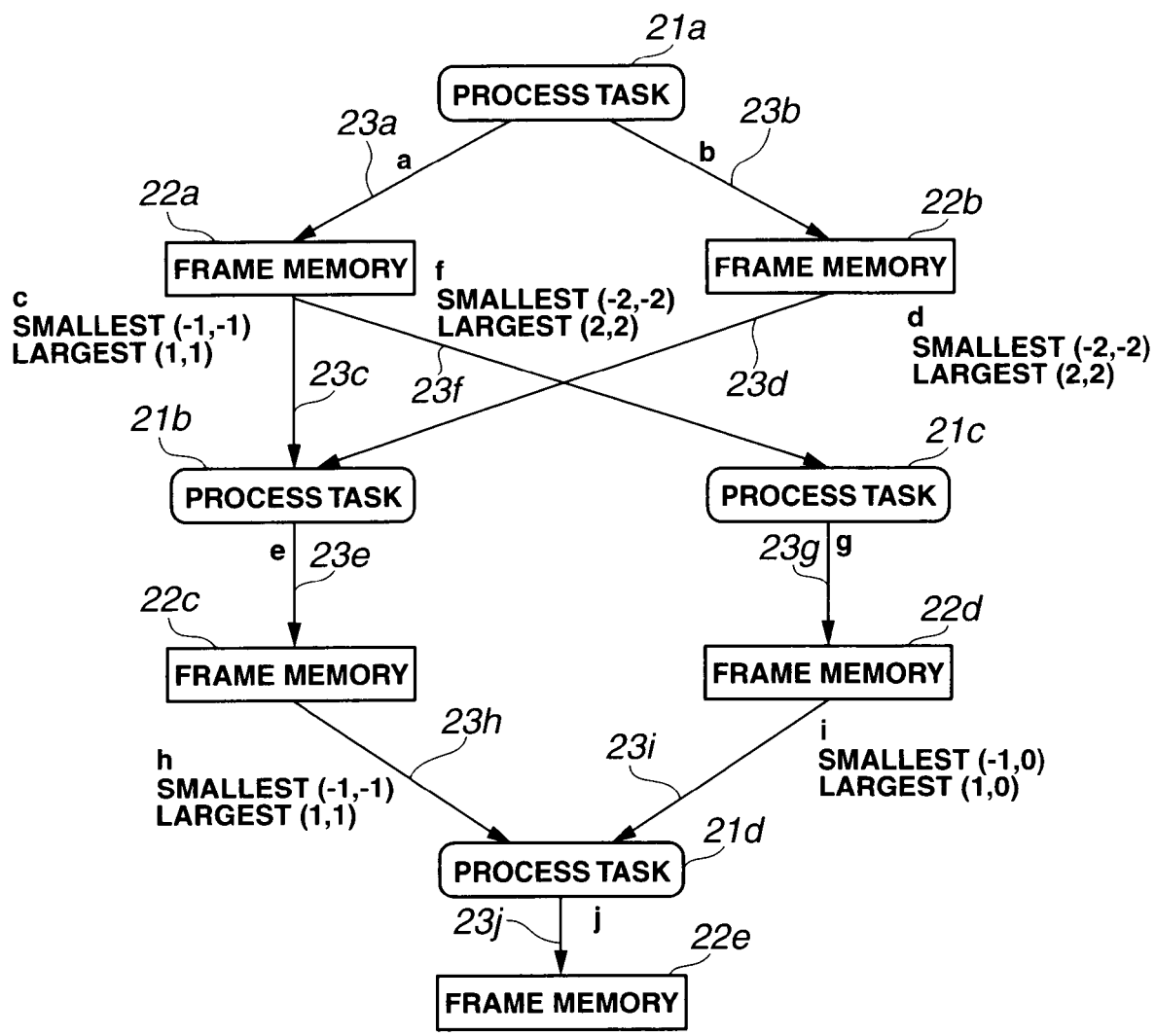
FIG. 5 is a diagram illustrating an example in which access range information is added to the directed graph of FIG. 4.

FIG. 5 is a diagram illustrating an example in which access range information is added to the directed graph in FIG. 4. The access range information is added only to the edges directed from nodes of frame memories to nodes of process tasks. In the example in FIG. 5, the access range information is added to edges 23c, 23d, 23f, 23h and 23i.

For example, when process task 21c in FIG. 4 accesses frame memory 22a at locations centered on a pixel location (Vx, Hx) at minimum −2 in a vertical direction and at minimum −2 in a horizontal direction and at maximum +2 in a vertical direction and at maximum +2 in a horizontal direction, the access range information adding section 13 adds the largest access range (LARGEST in FIG. 5) (2, 2) and the smallest access range (SMALLEST in FIG. 5) (−2, −2) to label f of corresponding edge 23f as illustrated in FIG. 5.

Then, the reference node determining section 14, which is a reference node determiner, determines as a reference node a last process task to be executed, or a last frame memory to be written in pipeline execution. The reference node determining section 14 sets information indicating a pixel location at which the process task writes, in other words, a data location, or a pixel location of data to be written in the frame memory, in other words a data location, (0, 0), as pixel location information for the reference node. Specifically, the reference node determining section 14 sets pixel location information (0, 0) for a node with an outdegree of 0, that is, the node of a process task that does not write, or the node of a frame memory from which data is not read. The values of (0, 0) indicate a vertical coordinate and a horizontal coordinate, in this order.

In the example in FIG. 5, a node with an outdegree of 0 is frame memory 22e from which data is not read. The reference node determining section 14 determines frame memory 22e as the reference node and sets the pixel location information (0, 0) for the node of frame memory 22e.

Then, the pixel location analyzing/adding section 15, which is a data location calculator, calculates information representing the pixel location of data to be written in each frame memory and information representing the pixel location on which each process task performs processing during pipeline execution on the basis of the values set by the reference node determining section 14, that is, the pixel location information and adds the information representing the pixel locations to the corresponding frame memories and process tasks.

Figure 6:
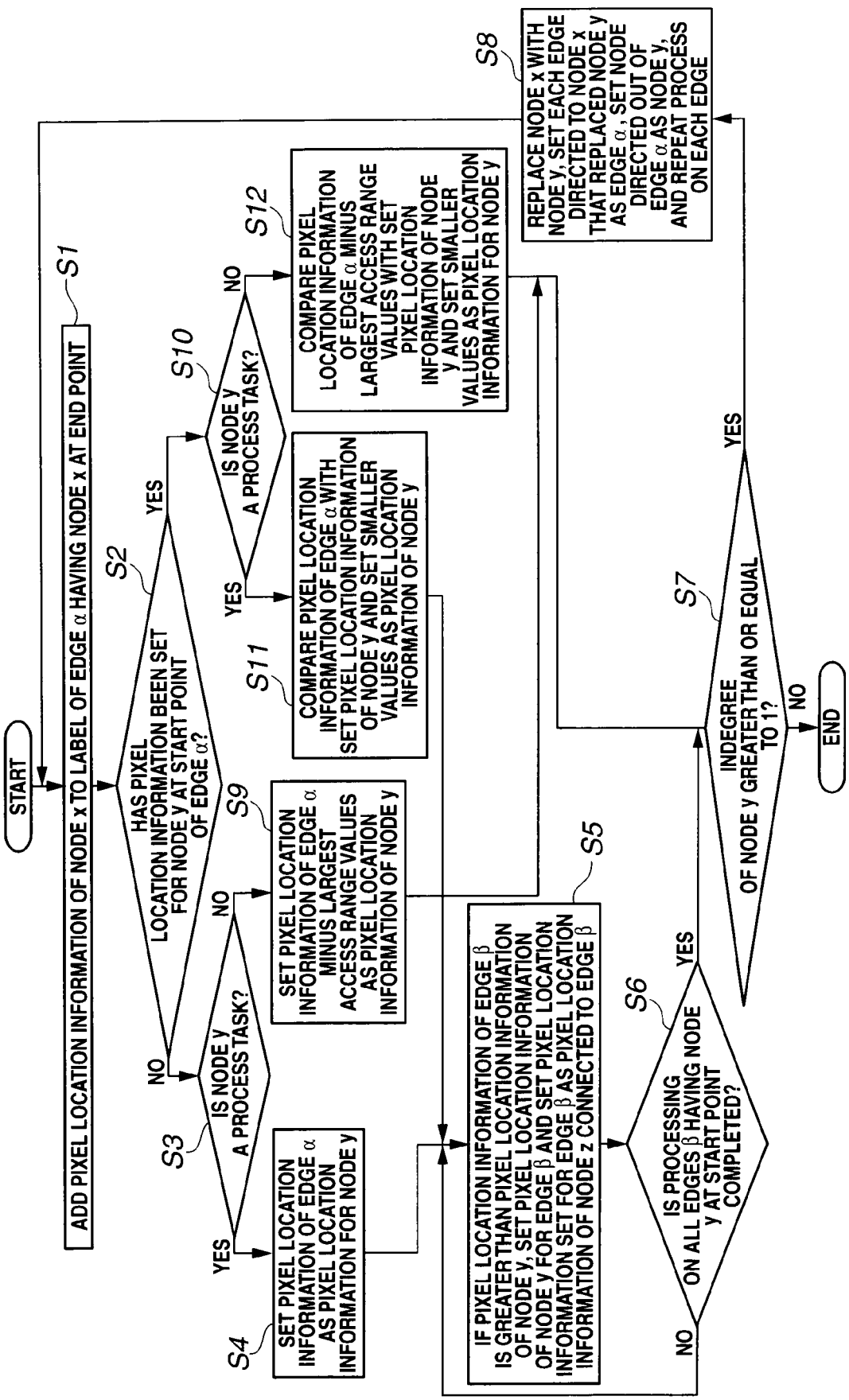
FIG. 6 is a flowchart illustrating process for calculating pixel location information.

Specifically, the pixel location analyzing/adding section 15 performs a process illustrated in FIG. 6 for node x, edge α and node y, where node x is a node with an outdegree of 0, edge α is an edge directed into node x, and node y is a node directed out of edge α. In the example in FIG. 5, node x is frame memory 22e, edge α is edge 23j, and node y is process task 21d.

Figure 7:
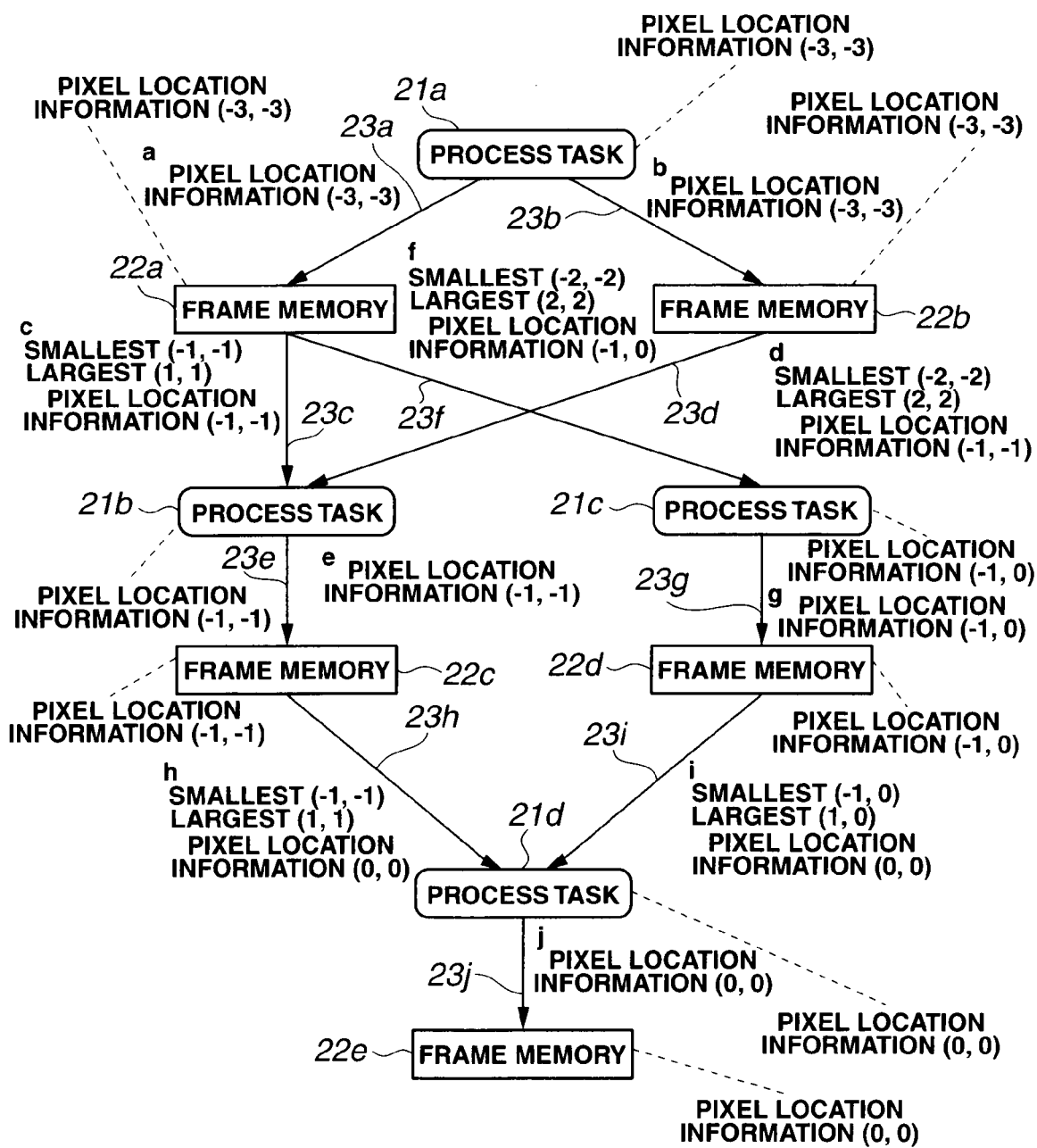
FIG. 7 is a diagram illustrating a result of the process of flowchart in FIG. 6 performed on the directed graph in FIG. 5.

FIG. 6 is a flowchart illustrating an exemplary process for computing information representing a pixel location. FIG. 7 is a diagram illustrating a result of execution of the process in the flowchart of FIG. 6 performed on the directed graph in FIG. 5.

First, pixel location information of node x is added to the label of edge α which has node x at an end point (step S1). In the example in FIG. 7, the pixel location information (0, 0) of frame memory 22*e* is added to label j of edge 23*j*. Then, determination is made as to whether pixel location information has been set for node y at the start point of edge α (step S2). In this process, determination is made as to whether pixel location information is set for process task 21*d*. If it is determined that pixel location information has not been set (determination at step S2 is NO), determination is made as to whether node y is a process task or not (step S3). If node y is a process task (determination at step S3 is YES), pixel location information of edge α is set as pixel location information of node y (step S4). In the example in FIG. 7, the pixel location information (0, 0) of edge 23*j* is set as the pixel location information of process task 21*d*.

Then, if pixel location information of edge β having node y at the end point is greater than the pixel location information of node y, the pixel location information of node y is set for edge β and the pixel location information set for edge β is set as pixel location information for node z connected at the start point of edge β (step S5). After step S5, determination is made as to whether all edges β having node y at the end point has been processed (step S6). If not all edges β have been processed (determination at step S6 is NO), the process returns to step S5 and the same process is repeated. On the other hand, if all edges β have been processed (determination at step S6 is YES), determination is made as to whether the indegree of node y is greater than or equal to 1 (step S7). If the indegree is greater than or equal to 1 (determination at step S7 is YES), node y is replaced with node x, each of the edges that are directed into node x that has replaced node y is set as edge α, and a node from which edge α emanates is set as node y (step S8), then the process returns to step S1 and the same process is repeated. In the example in FIG. 5, when process task 21*d* is node y, process task 21*d* becomes node x, edge 23*h* is set as edge α, and frame memory 22*c* is set as node y by step S8 and then the process is repeated from step S1. Similarly, another edge, edge 23*i* is set as edge α, frame memory 22*d* is set as node y, and then the process is repeated from step S1.

When process task 21*d* becomes node x and edge 23*h* is edge α and frame memory 22*c* is node y, the pixel location information of process task 21*d* is added to edge 23*h* at step S1 and determination at step S3 will be NO because node y is frame memory 22*c*. When the determination at step S3 is NO, the pixel location information of edge α minus the largest access range values is set as pixel location information of node y (step S9), then the process proceeds to step S7. In FIG. 7, the pixel location information (0, 0) of edge 23*h* minus the largest access range values (1, 1), that is, (−1, −1) is set as the pixel location information of frame memory 22*c*.

On the other hand, if it is determined at step S2 that pixel location information has been set (determination at step S2 is YES), determination is made as to whether node y is a process task (step S10). If it is determined that node y is a process task (determination at step S10 is YES), the pixel location information of edge α is compared with the pixel location information set for node y and the smaller values are set as the pixel location information of node y (step S11), then the process proceeds to step S5. On the other hand, it is determined that node y is not a process task (determination at step S10 is NO), the pixel location information of edge α minus the largest access range values is compared with the pixel location information set for node y and the smaller values are set as the pixel location information of node y, then the process proceeds to step S7. If it is determined at step S7 that the indegree of node y is not greater than or equal to 1, the process will end. The same process is repeated and, after the process on process task 21*a* is completed, the indegree becomes 0 and the process will end.

In FIG. 7, the pixel location information of frame memory 22*a* is set to (−3, −2) based on the pixel location information (−1, 0) of process task 21 and the largest access range values (2, 2) of edge 23*f*. However, the pixel location information of process task 21*a* is set to (−3, −3) based on the pixel location information of frame memory 22*b* and edge 23*b*. Accordingly, the pixel location information of frame memory 22*a* and edge 23*a* is set to (−3, −3) by processing at step S5.

Figure 8:
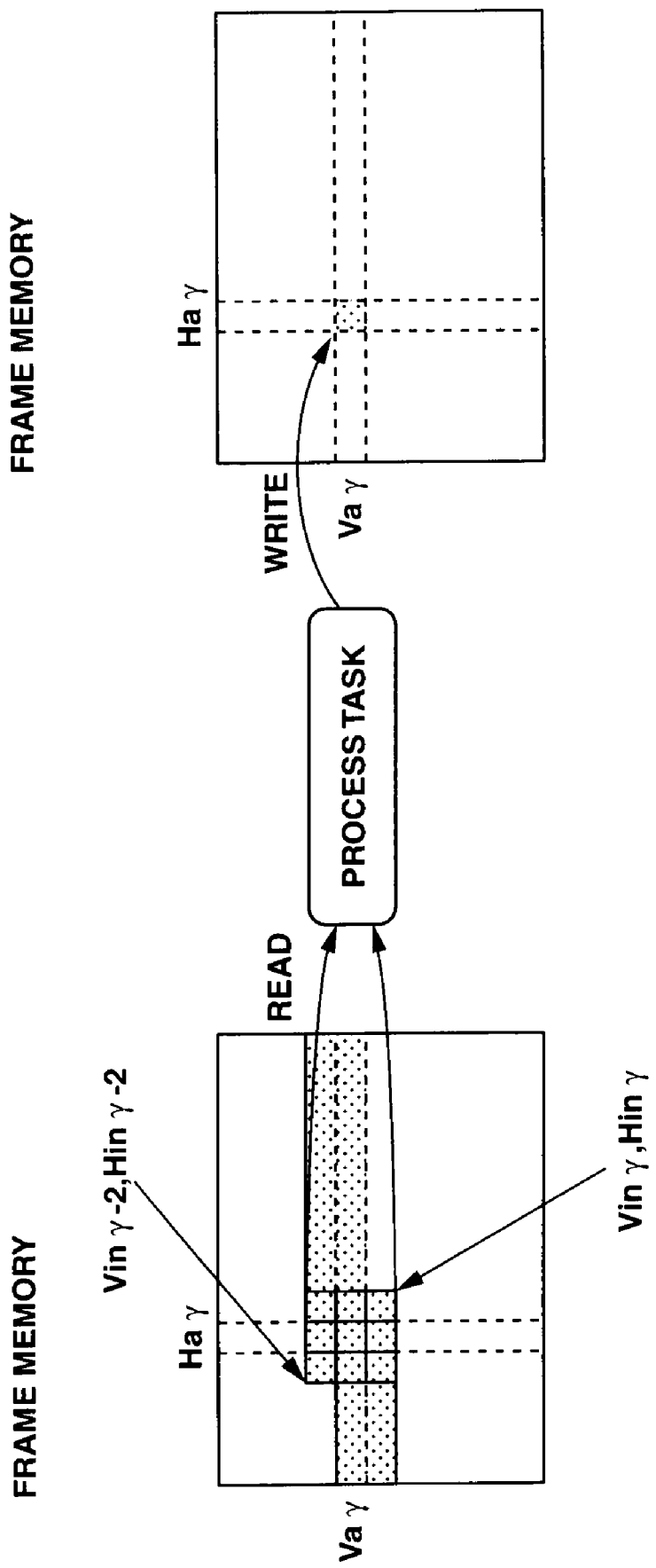
FIG. 8 is a diagram illustrating relationship between a read pixel location and a write pixel location for a process task.

The process in FIG. 6 obtains the relationship between a pixel location at which a process task illustrated in FIG. 8, for example, reads data and a pixel location at which the process task writes, on the basis of a process task that is the origin.

FIG. 8 is a diagram illustrating the relationship between a read pixel location and write pixel location of a process task. In the example in FIG. 8, when the pixel location (Vaγ, Haγ) in the frame memory at which the process task writes data is (−2, −2), the pixel location of the edge directed from the process task to the frame memory is also (−2, −2) and the pixel location of the process task is also (−2, −2). From the process task, an edge directed into the process task is followed and the pixel location of the edge is also found to be (−2, −2). The pixel location of the node from which the edge emanates, that is, the pixel location (Vinγ, Hinγ) in the frame memory in the left-hand part of FIG. 8, is found to be (−3, −3) by subtracting the largest access range values (1, 1) from (−2, −2).

As seen from the foregoing, the processing delay amount between two process tasks is equivalent to the difference between the pieces of pixel location information of their corresponding process task nodes. For example, the pixel location information of process task 21*b* in FIG. 7 is (−1, −1) and the pixel location of process task 21*d* is (0, 0). Therefore, the processing delay amount between process tasks 21*b* and 21*d* is (1, 1). In a cycle of pipeline processing in which process task 21*b* processes data at the pixel location with a vertical coordinate of 10 and a horizontal coordinate of 12, process task 21*d* may process data at the pixel location with a vertical coordinate of 9 and a horizontal coordinate of 11. That is, while process task 21*d* obtains data at the pixel location (+1, +1) from the image location (9, 11) during the processing, the data obtained has been written by the process task 21*b*.

Then, the processing delay amount analyzing section 16, which is a processing delay amount calculator, determines the amount of processing delay between process tasks on the basis of the state of each pixel processed by each process task, in other words, on the state of each piece of data. Specifically, the processing delay amount analyzing section 16 obtains the pixel location of a node that has the smallest pixel location information among nodes with an indegree of 0, that is, the nodes of process tasks that do not read, or the nodes of frame memories to which data is not written. In the example in FIG. 7, only process task 21*a* has an indegree of 0 and its pixel location information is (−3, −3). From the pixel location information and the pixel location information of a next process task to be executed, the processing delay amount of the next process task is determined. Specifically, the processing delay amount analyzing section 16 determines the processing delay amount of a certain process task by subtracting the pixel location information of a next process task to be executed from the pixel location information of the certain process task.

For example, the processing delay amount of process task 21b in pipeline execution is the pixel location information (−3, −3) of process task 21a minus the pixel location information (−1, −1) of process task 21b equal to (−2, −2). That is, process task 21b is to perform processing on the pixel location at −2 vertically distant from the pixel location on which process task 21a performs processing and −2 horizontally distant from that pixel location.

Then the line memory amount determining section 17, which is a line memory amount calculator, calculates the line memory size required when each frame memory is reallocated as a line memory. The line memory amount determining section 17 calculates the line memory size required for each process task on the basis of the access range in the frame memory from which that process task reads data.

Figure 9:
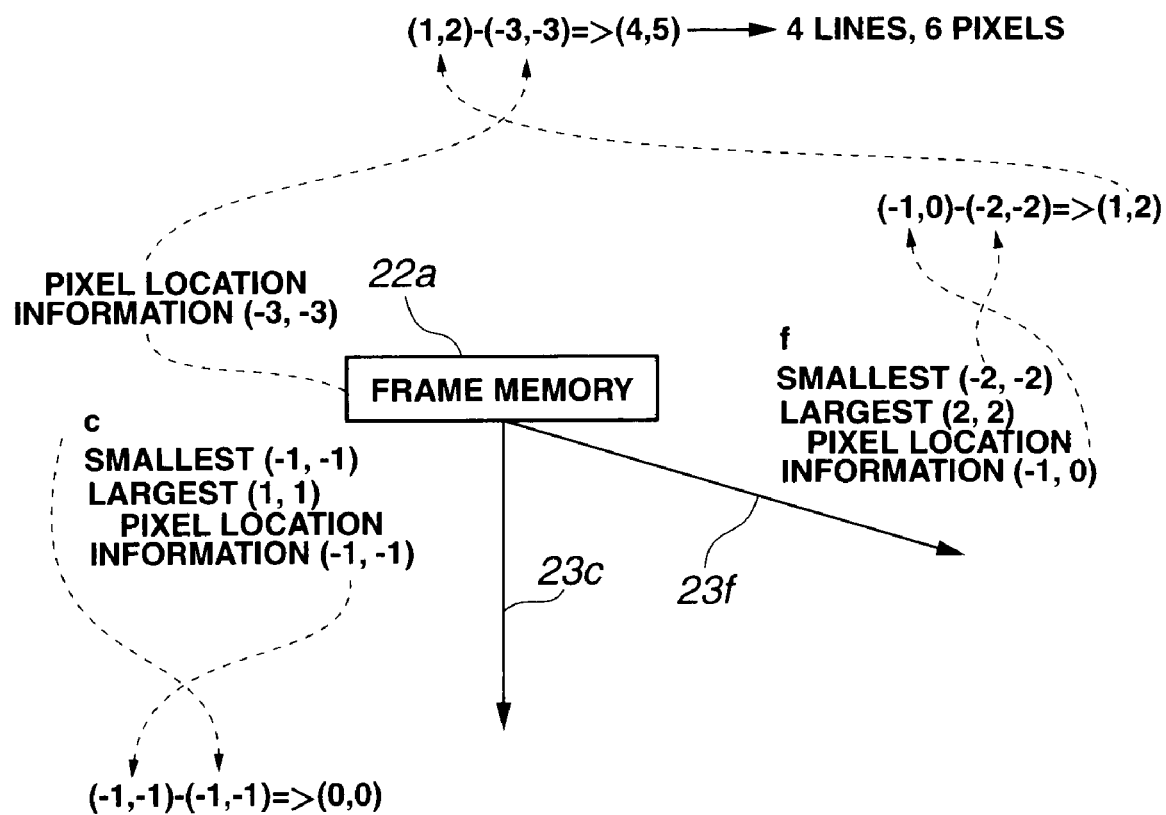
FIG. 9 is a diagram illustrating an exemplary process that calculate required line memory size.

FIG. 9 is a diagram illustrating a required line memory size. The required line memory size is calculated from the difference between pixel location information set for a frame memory and pixel location information representing the last pixel location accessed by a read edge for that frame memory. Specifically, the line memory size is calculated as follows.

The largest pixel location information accessed in the frame memory to be calculated is obtained. The procedure is to calculate the farthest ahead pixel location from which data needs to be stored in memory, from the last process task to be executed in a pipeline. Specifically, the smallest access range values are subtracted from pixel location information for all outgoing edges of the node of the frame memory and the largest values among the results are obtained.

For edge 23f of frame memory 22a in the example in FIG. 9, the smallest access range values (−2, −2) are subtracted from pixel location information (−1, 0) to obtain (1, 2). For edge 23c of frame memory 22a, the smallest access range values (−1, −1) are subtracted from pixel location information (−1, −1) to obtain (0, 0). As a result, the largest values are (1, 2).

The line memory amount determining section 17 then obtains the difference between the pixel location information of corresponding frame memory 22a and the resulting largest values. In the example in FIG. 9, (1, 2)−(−3, −3)=(4, 5) is obtained.

The vertical coordinate value in the result indicates the required number of lines. Additionally, the horizontal coordinate value plus 1 pixels are needed for line memory. In this case, the line memory size is 4 lines plus 6 pixels.

In this way, the amount of processing delay between process tasks and the line memory size for storing data passed from one process task to another during pipeline execution of process tasks are determined through the processing performed by the connection graph generating section 11 to the processing performed by the line memory amount determining section 17. Based on the processing delay amounts and the line memory sizes determined, the pipelining section 18, which is an instruction code converter, generates an instruction code that causes the process tasks to be executed in a pipeline.

Figure 10:
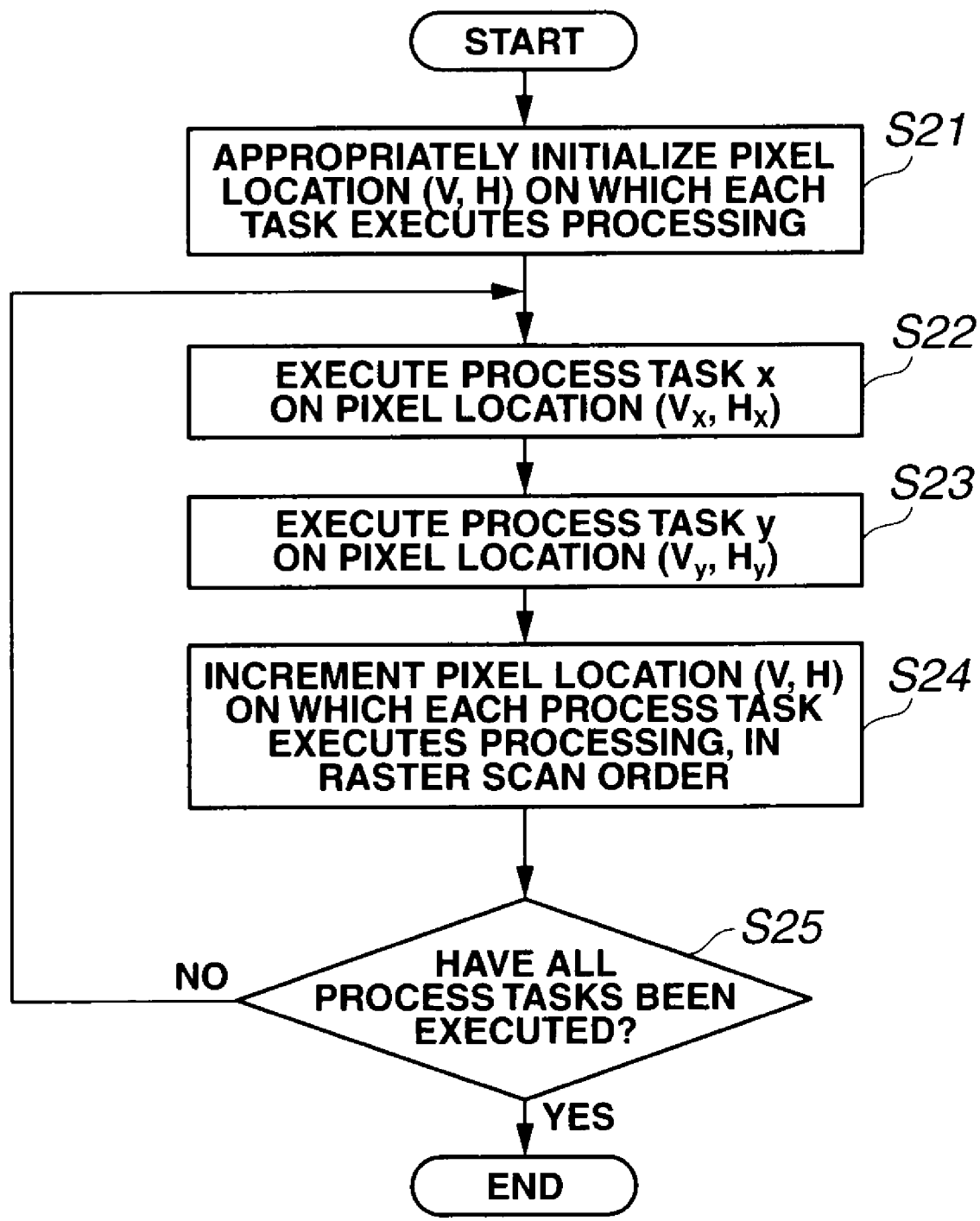
FIG. 10 is a flowchart illustrating an exemplary process flow in a pipelining section.

Specifically, the flow of execution in which a process task is executed on all pixels and then a next process task is executed when process tasks are not executed in a pipeline is changed to the flow illustrated in FIG. 10.

FIG. 10 is a flowchart illustrating an exemplary flow of process performed by the pipelining section.

First, a pixel location (V, H) at which each process task executes processing is appropriately initialized (step S21).

Here, appropriately initializing a pixel location means that a processing delay amount determined by the process delay amount analyzing section 16 is added to the pixel location. Then, processing of process task x is executed on a pixel location (Vx, Hx) (step S22), and processing of process task y is executed on a pixel location (Vy, Hy) (step S23). Processing at steps S22 and 23 are executed only when the pixel locations on which the process tasks execute processing are in an appropriate region, within an image size herein.

Then, the pixel locations (V, H) on which the process tasks execute processing are incremented in raster scan order (step S24). Lastly, determination is made as to whether processing of all process tasks has been completed or not (step S25). If it is determined that not all process tasks have completed processing (determination at step S25 is NO), the process returns to step S22 and the same process is repeated. On the other hand, if it is determined that processing of all process tasks has been completed (determination at step S25 is YES), the process will end.

While two process tasks are executed in a pipeline in the flowchart of FIG. 10, three or more process task may be executed in a pipeline. In that case, the flowchart of FIG. 10 can be modified simply by inserting the three or more process tasks between steps S21 and S24.

The pipelining section 18 changes areas allocated as frame memories so as to be allocated as line memories. The size of each line memory to be allocated is determined by the line memory amount determining section 17 at the node of the frame memory corresponding to the line memory.

The pipelining section 18 changes store addresses so that data access made by the process tasks in order to write data to the frame memories is made to the corresponding line memories allocated.

An address in each line memory at which data is to be written is determined as follows. An address at which process task x writes data when process task x uses a frame memory is an address at a distance of (Vx×width of image+Hx)× number of bytes per pixel from the beginning of the frame memory, that is, an offset address in the frame memory.

The size of a line memory is equal to (N×width of image+ M)×number of bytes per pixel, where N is the number of lines and M is the number of pixels allocated.

An address at which data is to be written when a line memory is used is equal to the remainder yielded upon division of the offset address in the frame memory divided by the size of the line memory.

The pipelining section 18 also changes load addresses so that data access made by the process tasks in order to read data from the frame memories is made to the corresponding line memory allocated.

An address in each line memory from which data is to be read is determined as follows. When process task x using a frame memory reads data at a location displaced from Vx, Hx by Voffset, Hoffset, the address is at a distance of ((Vx+ Voffset)×width of image+(Hx+Hoffset))×number of bytes per pixel from the beginning of the frame memory, that is, an offset address in the frame memory.

The size of a line memory is equal to (N×width of image+ M)×number of bytes per pixel, where N is the number of lines and M is the number of additional pixels needed to be allocated to hold data that will be accessed with reference with largest access range.

An address from which data is read when a line memory is used is equal to the remainder yielded upon division of the offset address in the frame memory divided by the size of the line memory.

In this way, the compiling device 1 calculates processing delay amounts and required line memory sizes from a source file written so as to use frame memory and generates an object file to be executed in a pipeline. Consequently, a user does not have to calculate processing delay amounts and line memory sizes required for implementing pipeline execution.

Thus, the compiling device according to the present embodiment is capable of improving productivity by extracting processing delay amounts and required line memory sizes from a source file written so as to use frame memories.

(Second Embodiment)

A second embodiment will be described below. An image processor that receives instruction sequences that include only instructions to be executed by process tasks, processing delay amounts, and required line memory size obtained by the compiling device 1 of the first embodiment and executes processing will be described in the second embodiment.

Figure 11:
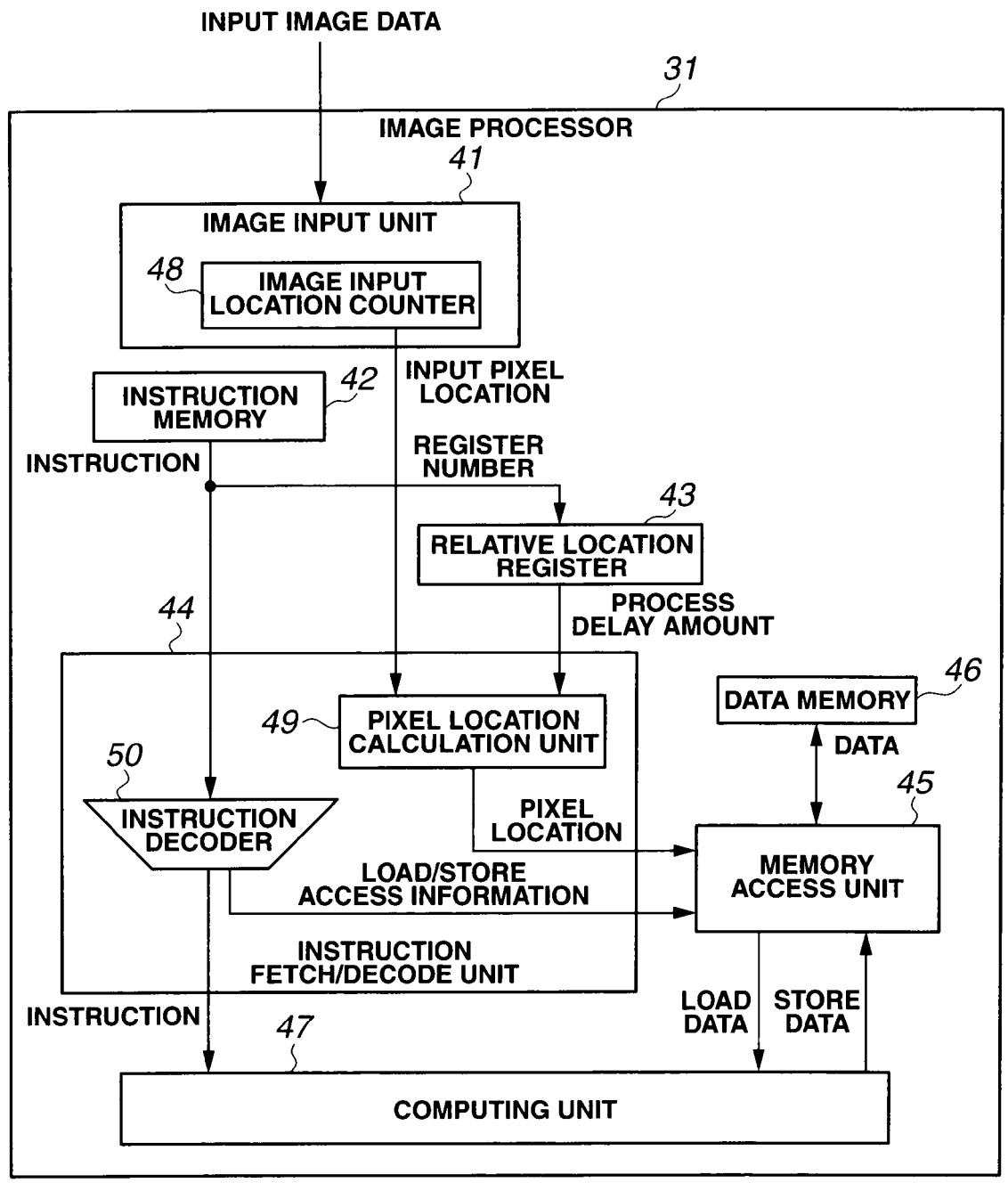
FIG. 11 is a block diagram illustrating a configuration of an image processor according to a second embodiment.

FIG. 11 is a block diagram illustrating a configuration of an image processor relating to the second embodiment.

As illustrated in FIG. 11, an image processor 31 includes an image input unit 41, an instruction memory 42, a relative location register 43, an instruction fetch/decode unit 44, a memory access unit 45, a data memory 46, and a computing unit 47. The image input unit 41 includes an image input location counter 48. The instruction fetch/decode unit 44 includes a pixel location calculation unit 49 and an instruction decoder 50.

The image processor 31 of the present embodiment sets a processing delay amount obtained by the processing delay amount analyzing section 16 of the first embodiment in the relative location register 43. The image processor 31 of the present embodiment allocates a required area on the data memory 46 according to a line memory size determined by the line memory amount determining section of the first embodiment.

Input image data is provided from a source such as an input sensor, not depicted, to the image input unit 41. The image input location counter 48 of the image input unit 41 counts pixel locations in the input image data and outputs the count value to the pixel location calculation unit 49. The image input location counter 48 increments pixel locations in raster scan order according to the input image data.

Instruction sequences which have been obtained by the compiling device 1 of the first embodiment and which include only instructions to be executed by process tasks are stored in the instruction memory 42. In a load instruction to load data into a line memory area, a location to access is specified in terms of its displacement from a pixel location to be processed by each instruction. A store instruction to store data to a line memory area includes line memory area information that uniquely identifies a line memory area to access. An address where data is to be written is a pixel location calculated by the pixel location calculation unit 49. Since steps S21, S24 and S25 of FIG. 10 are automatically performed by the image processor 31, the instruction sequence includes only steps S22 and S23 of FIG. 10.

Each of instruction sequences stored in the instruction memory 42 has a register number for referring to a relative location register 43. The register number is input into the relative location register 43 and a processing delay amount specified by the register number is input into the pixel location calculation unit 49.

The instruction fetch/decode unit 44 fetches an instruction stored in the instruction memory 42. The pixel location calculation unit 49 subtracts the value in the relative location register 43 from the value in the image input location counter 48 to obtain a pixel location (Vx, Hx) to be processed by the instruction. The pixel location calculation unit 49 outputs the pixel location (Vx, Hx) information to the memory access unit 45.

The instruction decoder 50 decodes an instruction input from the instruction memory 42 and outputs the decoded instruction and load/store access information to the computing unit 47 and the memory access unit 45, respectively.

The memory access unit 45 performs conversion to a store address performed in the pipelining section 18 of the first embodiment on the basis of load/store access information input from the instruction decoder 50 and writes store data into the data memory 46. The memory access unit 45 also performs conversion to load address performed in the pipelining section 18 of the first embodiment on the basis of load/store access information input from the instruction decoder 50, reads data from the data memory 46, and outputs the data to the computing unit 47.

The computing unit 47 executes an instruction output from the instruction decoder 50 on load data from the memory access unit 45 and outputs the result to the memory access unit 45 as store data.

With the configuration described above, the image processor 31 can receive instruction sequences including only instructions to be executed by process tasks, processing delay amounts and required line memory sizes obtained by the compiling device 1 of the first embodiment and execute processing.

The order in which the steps of the processes in the flowcharts described herein are executed may be changed or some of the steps may be executed concurrently or the steps may be executed in different orders each time the processes are executed as long as the change is not against their nature.

A program that executes the operations described above is in part or in whole recorded or stored on a portable medium such as flexible disk or CD-ROM or a storage medium such as a hard disk as a computer program product. The program is read by a computer and part or all of the operations are executed on the computer. Alternatively, the program in part or in whole can be distributed or provided through a communication network. A user can readily implement the compiling device of the present invention by downloading the program through the communication network and installing the program into a computer, or by installing the program from a recording medium into a computer.

The present invention is not limited to the embodiments described above. Various changes and modification can be made to the embodiments without departing from the spirit of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A compiling device compiling a source program written so as to use a frame memory, the compiling device comprising: a processor, the compiling device for execution on the processor; a processing delay amount calculator configured to calculate respective processing delay amounts between a plurality of process tasks in the source program on the basis of processing states of pieces of data to be processed by the process tasks; a line memory amount calculator configured to calculate respective line memory sizes required for each of the process tasks on the basis of an access range of a frame memory from which the process task reads data; an instruction code converter configured to convert a plurality of the process tasks to instruction codes executable in a pipeline on the basis of the processing delay amounts and the line memory sizes; a directed graph generator configured to generate, on the basis of access states of the plurality of process tasks making access to a plurality of the frame memories, a directed graph in which nodes of the plurality of process tasks are connected to nodes of the plurality frame memories through directed edges; an access range extractor configured to extract access ranges in frame memories to which the plurality of process tasks make read access with a certain cycle; an access range adder configured to add the extracted access ranges to labels of the corresponding directed edges; a reference node determiner configured to determine as a reference node a last process task to be executed or a last frame memory to be written to in pipeline execution and to set data location information representing a reference data for the determined reference node; and a data location calculator configured to calculate data location information to be written in each of the frame memories and data location information on which each of the process tasks is executed, on the basis of the set data location information representing the reference data and to add the calculated data location information to each corresponding one of the frame memories and each corresponding one of the process tasks.

2. The compiling device according to claim 1, wherein: the processing delay amount calculator calculates a difference between pieces of the data location information added to the plurality of process tasks as each of the processing delay amounts between the plurality of process tasks.

3. The compiling device according to claim 1, wherein: the directed graph generator generates the directed graph by connecting nodes of the plurality of process tasks with nodes of frame memories from which the corresponding plurality of process tasks read data and nodes of frame memories into which the tasks write data through the directed edges.

4. The compiling device according to claim 1, wherein the access range includes a largest access range value which is the largest value in the range to be accessed by each of the plurality of process tasks, and a smallest access range value which is the smallest value in the range to be accessed by each of the plurality of the process tasks, the range being centered at data to be processed by the process task with the certain cycle.

5. The compiling device according to claim 4, wherein the access range adder adds the largest and smallest access range values to a label of a corresponding one of the directed edges.

6. A compiling method for compiling a source program written so as to use a frame memory, the compiling method comprising: calculating respective processing delay amounts between a plurality of process tasks in the source program on the basis of processing states of pieces of data to be processed by the process tasks; calculating respective line memory sizes required for each of the process tasks on the basis of an access range of a frame memory from which the process task reads data; converting the plurality of process tasks to instruction codes executable in a pipeline on the basis of the processing delay amounts and the line memory sizes; on the basis of access states of the plurality of process tasks making access to a plurality of the frame memories, generating a directed graph in which nodes of the plurality of process tasks are connected to nodes of the plurality frame memories through directed edges; extracting access ranges in frame memories to which the plurality of process tasks make read access with a certain cycle; adding the extracted access ranges to labels of the corresponding directed edges; determining as a reference node a last process task to be executed or a last frame memory to be written to in pipeline execution and setting data location information representing a reference data location for the determined reference node; and calculating data location information representing a data location of data to be written in each of the frame memories and data location information representing a data location on which each of the process tasks is executed, on the basis of the set data location information representing the reference data location and adding the calculated data location information representing the data location to each corresponding one of the frame memories and each corresponding one of the process tasks.

7. The compiling method according to claim 6, wherein a difference between pieces of the data location information added to the plurality of process tasks is calculated as each of the processing delay amounts between the plurality of process tasks.

8. The compiling method according to claim 6, wherein the directed graph is generated by connecting nodes of the plurality of process tasks with nodes of frame memories from which the corresponding plurality of process tasks read data and nodes of frame memories into which the tasks write data through the directed edges.

9. The compiling method according to claim 6, wherein the access range includes a largest access range value which is the largest value in the range to be accessed by each of the plurality of process tasks, and a smallest access range value which is the smallest value in the range to be accessed by each of the plurality of the process tasks, the range being centered at data to be processed by the process task with the certain cycle.

10. The compiling method according to claim 9, wherein the largest and smallest access range values are added to a label of a corresponding one of the directed edges.

11. A compiling program recorded on a non-transitory, tangible computer-readable storage medium for causing a computer to execute compilation of a source program written so as to use a frame memory, the program comprising: a first code section configured to calculate respective processing delay amounts between a plurality of process tasks in the source program on the basis of processing states of pieces of data to be processed by the process tasks; a second code section configured to calculate respective line memory sizes required for each of the process tasks on the basis of an access range of a frame memory from which the process task reads data; a third code section configured to convert the plurality of process tasks to instruction codes executable in a pipeline on the basis of the processing delay amounts and the line memory sizes; a fourth code section configured to generate, on the basis of access states of the plurality of process tasks making access to a plurality of the frame memories, a directed graph in which nodes of the plurality of process tasks are connected to nodes of the plurality frame memories through directed edges; a fifth code section configured to extract access ranges in frame memories to which the plurality of process tasks make read access with a certain cycle; a sixth code section configured to add the extracted access ranges to labels of the corresponding directed edges; a seventh code section configured to determine as a reference node a last process task to be executed or a last frame memory to be written to in pipeline execution and to set data location information representing a reference data location for the determined reference node; and an eighth code section configured to calculate data location information representing a data location of data to be written in each of the frame memories and data location information representing a data location on which each of the process tasks is executed, on the basis of the set data location information representing the reference data location and to add the calculated data location information representing the data location to each corresponding one of the frame memories and each corresponding one of the process tasks.

* * * * *